Patented June 28, 1932

1,865,021

UNITED STATES PATENT OFFICE

HARRY McC. LARMOUR AND STEPHEN C. PIERCE, JR., OF MERCED, CALIFORNIA, ASSIGNORS TO YOSEMITE PORTLAND CEMENT CORPORATION, OF MERCED, CALIFORNIA, A CORPORATION OF DELAWARE

CEMENT AND PROCESS OF MAKING

No Drawing. Application filed November 8, 1929. Serial No. 405,837.

This invention relates to the manufacture of Portland cement and has for its objects a process of manufacture whereby the cement produced will be better controlled in regard to its time of set, and also as a new article of manufacture a cement made by the process.

The invention is the result of a discovery made by us while in quest for a more active controlling medium than gypsum or as an aid thereto, and it comprises incorporating manganous sulfate into Portland cement in certain proportions.

We have discovered that the additions of this substance in small quantities up to about 1 or $1\frac{1}{2}\%$ gives a set control heretofore unattainable while preserving all of the desirable qualities of the concrete or cement block made therefrom.

Anhydrous manganous sulfate ($MnSO_4$) or any of its crystallized forms up to $MnSO_4.7H_2O$ have been tried with success, and we find it may be incorporated with the cement in any of the following ways:

First, the manganous sulfate may be added to the clinker and ground with the clinker either with or without the addition of gypsum.

Second, the material may be reduced to a fine powder by grinding and thoroughly mixed with the cement subsequent to grinding.

Third, the material may be put in solution with the tempering water used for mixing the cement or concrete.

Fourth, it is also possible to add manganese to the raw materials and form the sulfate later. That is to say, a compound containing manganese may be added to the raw cement mix and burned in the kiln in the usual manner and subsequently passed through the various cooling and grinding operations for the production of cement, provided the material at some stage subsequent to the burning process be treated with a small amount of sulfuric acid, the amount of acid being such as to be the molecular equivalent of the manganese present. The acid may even be added to the mixing water used for tempering the cement in the mixing of concrete.

All of the above methods have been successfully tried out by us. With a cement mixture at normal (A. S. T. M.) consistency the manganous sulfate is effective as a retarder in proportions as low as $\frac{1}{4}$ of 1% and increases in effectiveness up to $1\frac{1}{2}\%$ of the anhydrous sulfate and at which point the retardation of set is several times as long as the normal set, but greater additions tend to undo the advantages gained and in fact actually hasten the setting time instead of retarding it.

The amount of manganous sulfate required depends on the particular cement in which it is incorporated, coarser ground cements requiring less of the salt than those of finer grind.

The chemical composition of the cement and mill practice are also factors as variations were found in retarding effect with given proportions of manganous sulfate added to various brands of cement on the California market. Each brand however was found to show a point of maximum retardation which ran all the way from twice to four times the normal time of set, and this without any loss of strength.

In the matter of concrete where the tempering water is usually at least 40% of the weight of the cement the results were very much greater retardation at normal temperature. Cements with a normal temperature set of 4 hours with 45% of water were retarded to 27 hours and by varying the amount of the reagent any intermediate point could be reached.

A 27 hour set of course is not in the realm of common practice or desire but the trend of central mixing plants makes a longer set than at present available.

Other conditions are met in the use of concrete where external conditions accelerate the normal setting qualities of the cement even to the extent of disintegrating the placed cement. The most important of these is heat. Extreme heat is encountered primarily in deep mines or oil wells, and in the California fields oil wells have been drilled sufficiently deep that temperatures as high as 207° F. have been encountered, thus making the use of the ordinary cements retarded with gypsum out of the question.

However, by using manganous sulfate and testing the set of the paste at 212° F. we have been able to retard the set of nearly every cement tested and in some cases have retarded set from ten minutes to two hours at this temperature. Oil well practice finds ten minutes a prohibitive set but would find from one and one-half to two hours very satisfactory.

In addition to the retardation of the cement we have found no objectionable effect produced by this reagent. The strength is as high as samples of the same cement produced without the addition of the reagent. Strength increasing reagents such as calcium chloride may be added without any noticeable change in effect. The only exception being where extreme retardation was effected the early strengths were lower but from seven days on normal results prevailed. With wet mixtures the retarding effect of the sulfate is much more pronounced.

Manganous sulfate is effective as a retarder whether gypsum is also ground with the clinker or not but in most cases it is more effective when the gypsum is also used, the retarding effect increasing as the gypsum is increased up to and including 7% from thereon to higher additions the gypsum acts as an accelerator.

From a consideration of our invention as above set forth, especially the remarkable retarding effect secured with hot mixtures, we feel that our invention entitles us to broad patent protection and therefore we claim:

1. The process of controlling set of Portland cement which comprises incorporating from 1/4 of 1% up to about 1 1/2% of manganous sulfate therewith.

2. The process of controlling set of Portland cement which comprises incorporating up to about 1 1/2% of manganous sulfate and grinding the same therewith.

3. A Portland cement in which is incorporated a quantity from 1/4 of 1% up to about 1 1/2% by weight of a sulfate of manganese.

HARRY McC. LARMOUR.
STEPHEN C. PIERCE, Jr.